United States Patent
Baruch et al.

(10) Patent No.: US 10,210,073 B1
(45) Date of Patent: Feb. 19, 2019

(54) REAL TIME DEBUGGING OF PRODUCTION REPLICATED DATA WITH DATA OBFUSCATION IN A STORAGE SYSTEM

(71) Applicant: EMC IP Holding Company, LLC, Hopkinton, MA (US)

(72) Inventors: Leehod Baruch, Rishon Leziyon (IL); Assaf Natanzon, Tel Aviv (IL); Ron Bigman, Holon (IL); Amit Lieberman, Raanana (IL); Jehuda Shemer, Kfar Saba (IL)

(73) Assignee: EMC IP HOLDING COMPANY, LLC, Hopkinton, MA (US)

(*) Notice: Subject to any disclaimer, the term of this patent is extended or adjusted under 35 U.S.C. 154(b) by 135 days.

(21) Appl. No.: 15/274,129

(22) Filed: Sep. 23, 2016

(51) Int. Cl.
*G06F 11/14* (2006.01)
*G06F 11/36* (2006.01)
*G06F 17/30* (2006.01)

(52) U.S. Cl.
CPC ...... *G06F 11/3664* (2013.01); *G06F 11/1446* (2013.01); *G06F 11/1451* (2013.01); *G06F 17/30575* (2013.01); *G06F 2201/84* (2013.01)

(58) Field of Classification Search
CPC ............ G06F 11/1451; G06F 11/1446; G06F 2201/84; G06F 17/30088
See application file for complete search history.

(56) References Cited

U.S. PATENT DOCUMENTS

| | | |
|---|---|---|
| 5,170,480 A | 12/1992 | Mohan et al. |
| 5,249,053 A | 9/1993 | Jain |
| 5,388,254 A | 2/1995 | Betz et al. |
| 5,499,367 A | 3/1996 | Bamford et al. |
| 5,526,397 A | 6/1996 | Lohman |
| 5,864,837 A | 1/1999 | Maimone |
| 5,879,459 A | 3/1999 | Gadgil et al. |
| 5,990,899 A | 11/1999 | Whitten |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

U.S. Appl. No. 15/274,362, filed Sep. 23, 2016, Baruch et al.

(Continued)

*Primary Examiner* — Jigar P Patel
(74) *Attorney, Agent, or Firm* — Daly, Crowley Mofford & Durkee, LLP

(57) ABSTRACT

Described embodiments provide systems and methods for operating a storage system. Writeable snapshot replicas of a production site of the storage system are periodically generated during a snapshot interval. The production site includes a production volume, a production memory, and at least one production application. Input/output (I/O) requests of the at least one production application are saved during the snapshot interval. A test environment is initiated with the writeable snapshot, the test environment comprising a test volume, a test memory, and at least one test application. The at least one test application is run in the test environment and the saved I/O requests of the at least one production application are replayed to the at least one test application in the test environment. Output data is provided from the test environment to the writeable snapshot.

14 Claims, 6 Drawing Sheets

(56) References Cited

U.S. PATENT DOCUMENTS

| | | |
|---|---|---|
| 6,042,652 A | 3/2000 | Hyun et al. |
| 6,065,018 A | 5/2000 | Beier et al. |
| 6,143,659 A | 11/2000 | Leem |
| 6,148,340 A | 11/2000 | Bittinger et al. |
| 6,174,377 B1 | 1/2001 | Doering et al. |
| 6,174,809 B1 | 1/2001 | Kang et al. |
| 6,203,613 B1 | 3/2001 | Gates et al. |
| 6,260,125 B1 | 7/2001 | McDowell |
| 6,270,572 B1 | 8/2001 | Kim et al. |
| 6,272,534 B1 | 8/2001 | Guha |
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |
| 6,804,676 B1 | 10/2004 | Bains, II |
| 6,947,981 B2 | 9/2005 | Lubbers et al. |
| 7,043,610 B2 | 5/2006 | Horn et al. |
| 7,051,126 B1 | 5/2006 | Franklin |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,519,625 B2 | 4/2009 | Honami et al. |
| 7,519,628 B1 | 4/2009 | Leverett |
| 7,546,485 B2 | 6/2009 | Cochran et al. |
| 7,590,887 B2 | 9/2009 | Kano |
| 7,606,940 B2 | 10/2009 | Yamagami |
| 7,719,443 B1 | 5/2010 | Natanzon |
| 7,757,057 B2 | 7/2010 | Sangapu et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,860,836 B1 | 12/2010 | Natanzon et al. |
| 7,882,266 B2 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,205,009 B2 | 6/2012 | Heller et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,613 B2 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,461 B1 | 3/2015 | Natanzon et al. |
| 8,996,480 B2 | 3/2015 | Frank et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 * | 10/2015 | Natanzon ............... G06F 3/0619 |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |

(56) References Cited

U.S. PATENT DOCUMENTS

| | | |
|---|---|---|
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 2002/0129168 A1 | 9/2002 | Kanai et al. |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0145317 A1 | 7/2003 | Chamberlain |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0179343 A1 | 8/2006 | Kitamura |
| 2006/0195670 A1 | 8/2006 | Iwamura et al. |
| 2007/0033356 A1* | 2/2007 | Erlikhman .......... G06F 11/1456 711/162 |
| 2007/0055833 A1 | 3/2007 | Vu et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2011/0295815 A1* | 12/2011 | Mandagere .......... G06F 11/1004 707/690 |
| 2012/0233123 A1* | 9/2012 | Shisheng .............. G06F 11/004 707/639 |
| 2012/0284233 A1* | 11/2012 | Otani ................ G06F 17/30088 707/649 |
| 2015/0127611 A1* | 5/2015 | Westerman ....... G06F 17/30088 707/639 |
| 2017/0323110 A1* | 11/2017 | Griffith ............... G06F 21/6218 |

OTHER PUBLICATIONS

U.S. Appl. No. 15/274,117, filed Sep. 23, 2016, Baruch.
U.S. Appl. No. 15/274,122, filed Sep. 23, 2016, Baruch et al.
U.S. Appl. No. 15/274,373, filed Sep. 23, 2016, Baruch et al.
U.S. Appl. No. 15/274,381, filed Sep. 23, 2016, Ayzenberg et al.
U.S. Appl. No. 15/275,677, filed Sep. 23, 2016, Baruch et al.
Gibson, "Five Point Plan Lies at the Heart of Compression Technology;" Tech Talk; Apr. 29, 1991; 1 Page.
Soules et al., "Metadata Efficiency in Versioning File Systems;" 2$^{nd}$ USENIX Conference on File and Storage Technologies; Mar. 31, 2003-Apr. 2, 2003; 16 Pages.
AIX System Management Concepts: Operating Systems and Devices; Bull Electronics Angers; May 2000; 280 Pages.
Soules et al., "Metadata Efficiency in a Comprehensive Versioning File System;" May 2002; CMU-CS-02-145; School of Computer Science, Carnegie Mellon University; 33 Pages.
"Linux Filesystems," Sams Publishing; 2002; Chapter 1: Introduction to Filesystems pp. 17-22 and Chapter 3: Overview of Journaling Filesystems pp. 67-71; 12 Pages.
Bunyan et al., "Multiplexing in a BrightStor® ARCserve® Backup Release 11;" Mar. 2004; 4 Pages.
Marks, "Network Computing, 33;" Cover Story; Feb. 2, 2006; 8 Pages.
Hill, "Network Computing, NA;" Cover Story; Jun. 8, 2006; 9 Pages.
Microsoft Computer Dictionary, Fifth Edition; 2002; 3 Pages.
Wikipedia; Retrieved on Mar. 29, 2011 from http://en.wikipedia.org/DEFLATE: Deflate; 6 Pages.
Wikipedia; Retrieved on Mar. 29, 2011 from http://en.wikipedia.org/wiki/Huffman_coding: Huffman Coding; 11 Pages.
Wikipedia; Retrieved on Mar. 29, 2011 from http://en.wikipedia.org/wiki/LZ77: LZ77 and LZ78; 2 Pages.

* cited by examiner

US 10,210,073 B1

REAL TIME DEBUGGING OF PRODUCTION REPLICATED DATA WITH DATA OBFUSCATION IN A STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. A distributed storage system may include data protection systems that back up production site data by replicating production site data on a secondary backup storage system. The production site data may be replicated on a periodic basis and/or may be replicated as changes are made to the production site data. The backup storage system may be situated in the same physical location as the production storage system, or in a physically remote location.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect provides a method of operating a storage system. Writeable snapshot replicas of a production site of the storage system are periodically generated during a snapshot interval. The production site includes a production volume, a production memory, and at least one production application. Input/output (I/O) requests of the at least one production application are saved during the snapshot interval. A test environment is initiated with the writeable snapshot, the test environment comprising a test volume, a test memory, and at least one test application. The at least one test application is run in the test environment and the saved I/O requests of the at least one production application are replayed to the at least one test application in the test environment. Output data is provided from the test environment to the writeable snapshot.

Another aspect provides a system that includes a processor and memory storing computer program code that when executed on the processor causes the processor to operate a storage system. The storage system is operable to perform the operations of periodically generating writeable snapshot replicas of a production site of the storage system are during a snapshot interval. The production site includes a production volume, a production memory, and at least one production application. Input/output (I/O) requests of the at least one production application are saved during the snapshot interval. A test environment is initiated with the writeable snapshot, the test environment comprising a test volume, a test memory, and at least one test application. The at least one test application is run in the test environment and the saved I/O requests of the at least one production application are replayed to the at least one test application in the test environment. Output data is provided from the test environment to the writeable snapshot.

Another aspect provides a computer program product including a non-transitory computer readable storage medium having computer program code encoded thereon that when executed on a processor of a computer causes the computer to operate a storage system. The computer program product includes computer program code for periodically generating writeable snapshot replicas of a production site of the storage system are during a snapshot interval. The production site includes a production volume, a production memory, and at least one production application. Input/output (I/O) requests of the at least one production application are saved during the snapshot interval. A test environment is initiated with the writeable snapshot, the test environment comprising a test volume, a test memory, and at least one test application. The at least one test application is run in the test environment and the saved I/O requests of the at least one production application are replayed to the at least one test application in the test environment. Output data is provided from the test environment to the writeable snapshot.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or data write request. In some embodiments, the term "storage system" may encompass physical computing systems, cloud or virtual computing systems, or a combination thereof. In some embodiments, the term "storage device" may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN)). In some embodiments, the term "storage device" may also refer to a storage array including multiple storage devices.

Figure 1:
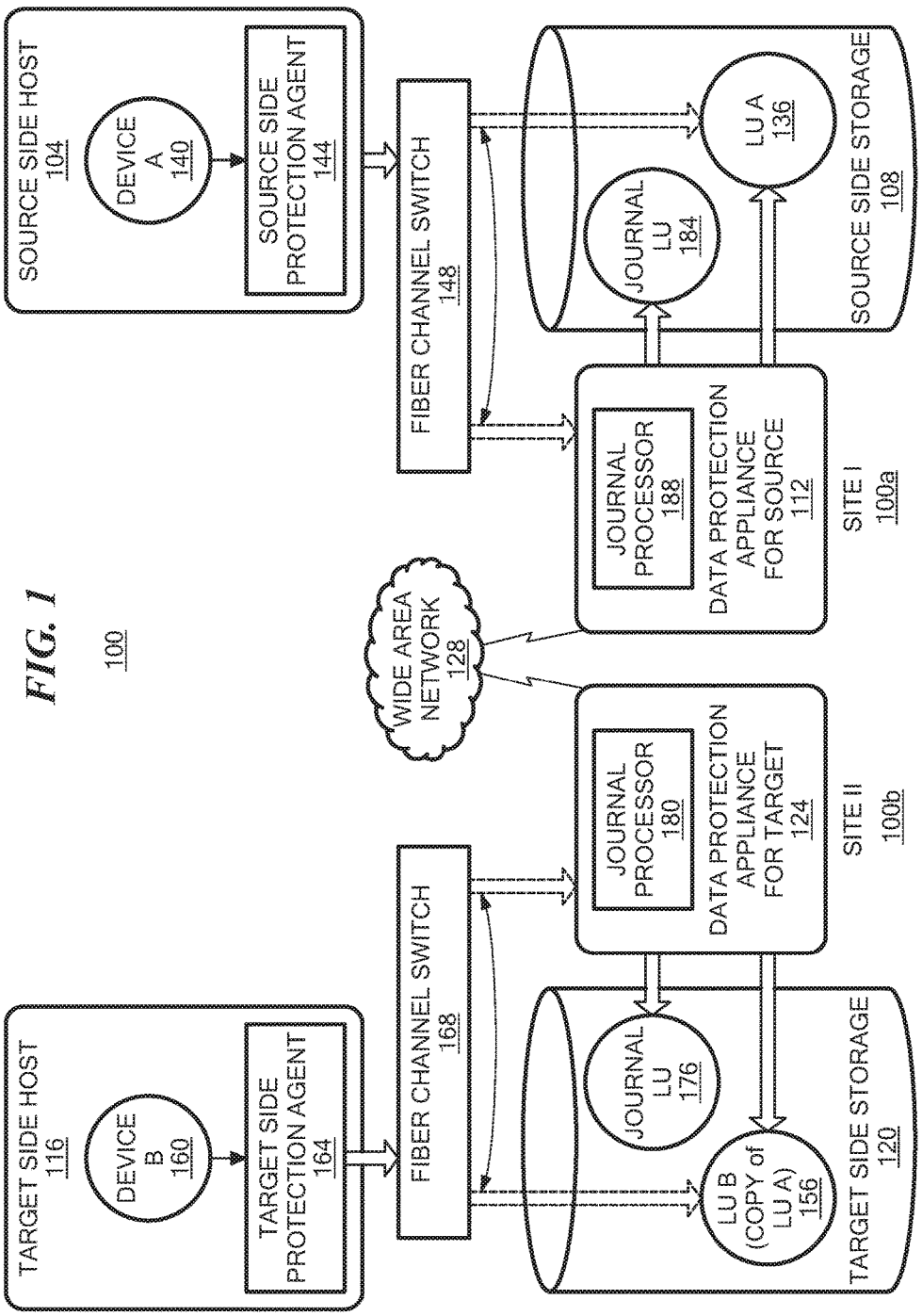
FIG. 1 is a block diagram of a data protection system, according to an illustrative embodiment of the instant disclosure.

Referring to the example embodiment shown in FIG. 1, a data protection system 100 may include two sites, Site I 100a and Site II 100b, which communicate via a wide area network (WAN) 128, such as the Internet. In some embodiments, under normal operation, Site I 100a may correspond to a source site (i.e., the transmitter within a data replication workflow) of system 100 and Site II 100b may be a target site (i.e., the receiver within a data replication workflow) of data protection system 100. Thus, in some embodiments, during normal operations, the direction of replicated data flow may be from Site I 100a to Site II 100b.

In certain embodiments, Site I 100a and Site II 100b may be remote from one another. In other embodiments, Site I 100a and Site II 100b may be local to one another and may be connected via a local area network (LAN). In some embodiments, local data protection may have the advantage of minimizing data lag between target and source, and remote data protection may have the advantage of being robust in the event that a disaster occurs at the source site.

In particular embodiments, data protection system 100 may include a failover mode of operation, wherein the direction of replicated data flow is reversed. In particular, in some embodiments, Site I 100a may behave as a target site and Site II 100b may behave as a source site. In some embodiments, failover may be triggered manually (e.g., by a user) or automatically. In many embodiments, failover may be performed in the event of a disaster at Site I 100a. In some embodiments, both Site I 100a and Site II 100b may behave as source site for some stored data and may behave simultaneously as a target site for other stored data. In certain embodiments, a portion of stored data may be replicated from one site to the other, and another portion may not be replicated.

In some embodiments, Site I 100a corresponds to a production site (e.g., a facility where one or more hosts run data processing applications that write data to a storage system and read data from the storage system) and Site II 100b corresponds to a backup or replica site (e.g., a facility where replicated production site data is stored). Thus, in some embodiments, Site II 100b may be responsible for replicating production site data and may enable rollback of data of Site I 100a to an earlier point in time. In some embodiments, rollback may be used in the event of data corruption of a disaster, or alternatively in order to view or to access data from an earlier point in time.

Described embodiments of Site I 100a may include a source host 104, a source storage system (or "storage array") 108, and a source data protection appliance (DPA) 112 coupled via a first storage area network (SAN). Similarly, in some embodiments, Site II 100b may include a target host 116, a target storage system 120, and a target DPA 124 coupled via a second SAN. In some embodiments, each SAN may include one or more devices (or "nodes") that may be designated an "initiator," a "target", or both. For example, in some embodiments, the first SAN may include a first fiber channel switch 148 and the second SAN may include a second fiber channel switch 168. In some embodiments, communication links between each host 104 and 116 and its corresponding storage system 108 and 120 may be any appropriate medium suitable for data transfer, such as fiber channel communication channel links. In many embodiments, a host communicates with its corresponding storage system over a communication link, such as an InfiniBand (IB) link or Fibre Channel (FC) link, and/or a network, such as an Ethernet or Internet (e.g., TCP/IP) network that may employ, for example, the iSCSI protocol.

In some embodiments, each storage system 108 and 120 may include storage devices for storing data, such as disks or arrays of disks. Typically, in such embodiments, storage systems 108 and 120 may be target nodes. In some embodiments, in order to enable initiators to send requests to storage system 108, storage system 108 may provide (e.g., expose) one or more logical units (LU) to which commands are issued. Thus, in some embodiments, storage systems 108 and 120 may be SAN entities that provide multiple logical units for access by multiple SAN initiators. In some embodiments, an LU is a logical entity provided by a storage system for accessing data stored therein. In some embodiments, a logical unit may be a physical logical unit or a virtual logical unit. In some embodiments, a logical unit may be identified by a unique logical unit number (LUN).

In the embodiment shown in FIG. 1, storage system 108 may expose logical unit 136, designated as LU A, and storage system 120 exposes logical unit 156, designated as LU B. LU B 156 may be used for replicating LU A 136. In such embodiments, LU B 156 may be generated as a copy of LU A 136. In one embodiment, LU B 156 may be configured so that its size is identical to the size of LU A 136.

As shown in FIG. 1, in some embodiments, source host 104 may generate a host device 140 ("Device A") corresponding to LU A 136 and source host 116 may generate a host device 160 ("Device B") corresponding to LU B 156. In some embodiments, a host device may be a logical entity within a host through which the host may access an LU. In some embodiments, an operating system of a host may generate a host device for each LU exposed by the storage system in the host SAN.

In some embodiments, source host 104 may act as a SAN initiator that issues I/O requests through host device 140 to LU A 136 using, for example, SCSI commands. In some embodiments, such requests may be transmitted to LU A 136 with an address that includes a specific device identifier, an offset within the device, and a data size.

In some embodiments, source DPA 112 and target DPA 124 may perform various data protection services, such as data replication of a storage system, and journaling of I/O requests issued by hosts 104 and/or 116. In some embodiments, when acting as a target DPA, a DPA may also enable rollback of data to an earlier point-in-time (PIT), and enable processing of rolled back data at the target site. In some embodiments, each DPA 112 and 124 may be a physical device, a virtual device, or may be a combination of a virtual and physical device.

In some embodiments, a DPA may be a cluster of such computers. In some embodiments, use of a cluster may ensure that if a DPA computer is down, then the DPA functionality switches over to another computer. In some embodiments, the DPA computers within a DPA cluster may communicate with one another using at least one communication link suitable for data transfer, for example, an InfiniBand (IB) link, a Fibre Channel (FC) link, and/or a network link, such as an Ethernet or Internet (e.g., TCP/IP) link to transfer data via fiber channel or IP based protocols, or other such transfer protocols. In some embodiments, one computer from the DPA cluster may serve as the DPA leader. In some embodiments, the DPA cluster leader may coordinate between the computers in the cluster, and may also perform other tasks that require coordination between the computers, such as load balancing.

In certain embodiments, a DPA may be a standalone device integrated within a SAN. Alternatively, in some embodiments, a DPA may be integrated into storage system. In some embodiments, the DPAs communicate with their respective hosts through communication links suitable for data transfer, for example, an InfiniBand (IB) link, a Fibre Channel (FC) link, and/or a network link, such as an Ethernet or Internet (e.g., TCP/IP) link to transfer data via, for example, SCSI commands or any other protocol.

In various embodiments, the DPAs may act as initiators in the SAN. For example, in some embodiments, the DPAs may issue I/O requests using, for example, SCSI commands, to access LUs on their respective storage systems. In some embodiments, each DPA may also be configured with the necessary functionality to act as targets, e.g., to reply to I/O requests, such as SCSI commands, issued by other initiators in the SAN, including their respective hosts. In some embodiments, being target nodes, the DPAs may dynamically expose or remove one or more LUs. As described herein, in some embodiments, Site I 100a and Site II 100b may each behave simultaneously as a production site and a backup site for different logical units. As such, in some embodiments, DPA 112 and DPA 124 may each behave as a source DPA for some LUs and as a target DPA for other LUs, at the same time.

In the example embodiment shown in FIG. 1, hosts 104 and 116 include protection agents 144 and 164, respectively. In some embodiments, protection agents 144 and 164 may be intercept commands (e.g., SCSI commands) issued by their respective hosts to LUs via host devices (e.g., host devices 140 and 160). In some embodiments, a protection agent may act on intercepted SCSI commands issued to a logical unit in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. In some embodiments, protection agents 144 and 164 may handle different SCSI commands, differently, according to the type of the command. For example, in some embodiments, a SCSI command inquiring about the size of a certain LU may be sent directly to that LU, whereas a SCSI write command may be split and sent first to a DPA within the host's site.

In various embodiments, a protection agent may change its behavior for handling SCSI commands, for example as a result of an instruction received from the DPA. For example, in some embodiments, the behavior of a protection agent for a certain host device may depend on the behavior of its associated DPA with respect to the LU of the host device. In some embodiments, when a DPA behaves as a source site DPA for a certain LU, then during normal course of operation, the associated protection agent may split I/O requests issued by a host to the host device corresponding to that LU. Similarly, in some embodiments, when a DPA behaves as a target device for a certain LU, then during normal course of operation, the associated protection agent fails I/O requests issued by host to the host device corresponding to that LU.

In some embodiments, communication between protection agents 144 and 164 and a respective DPA 112 and 124 may use any protocol suitable for data transfer within a SAN, such as fiber channel, SCSI over fiber channel, or other protocols. In some embodiments, the communication may be direct, or via a logical unit exposed by the DPA.

In certain embodiments, protection agents may be drivers located in their respective hosts. Alternatively, in some embodiments, a protection agent may also be located in a fiber channel switch, or in any other device situated in a data path between a host and a storage system or on the storage system itself. In some embodiments, in a virtualized environment, the protection agent may run at the hypervisor layer or in a virtual machine providing a virtualization layer.

Figure 2:
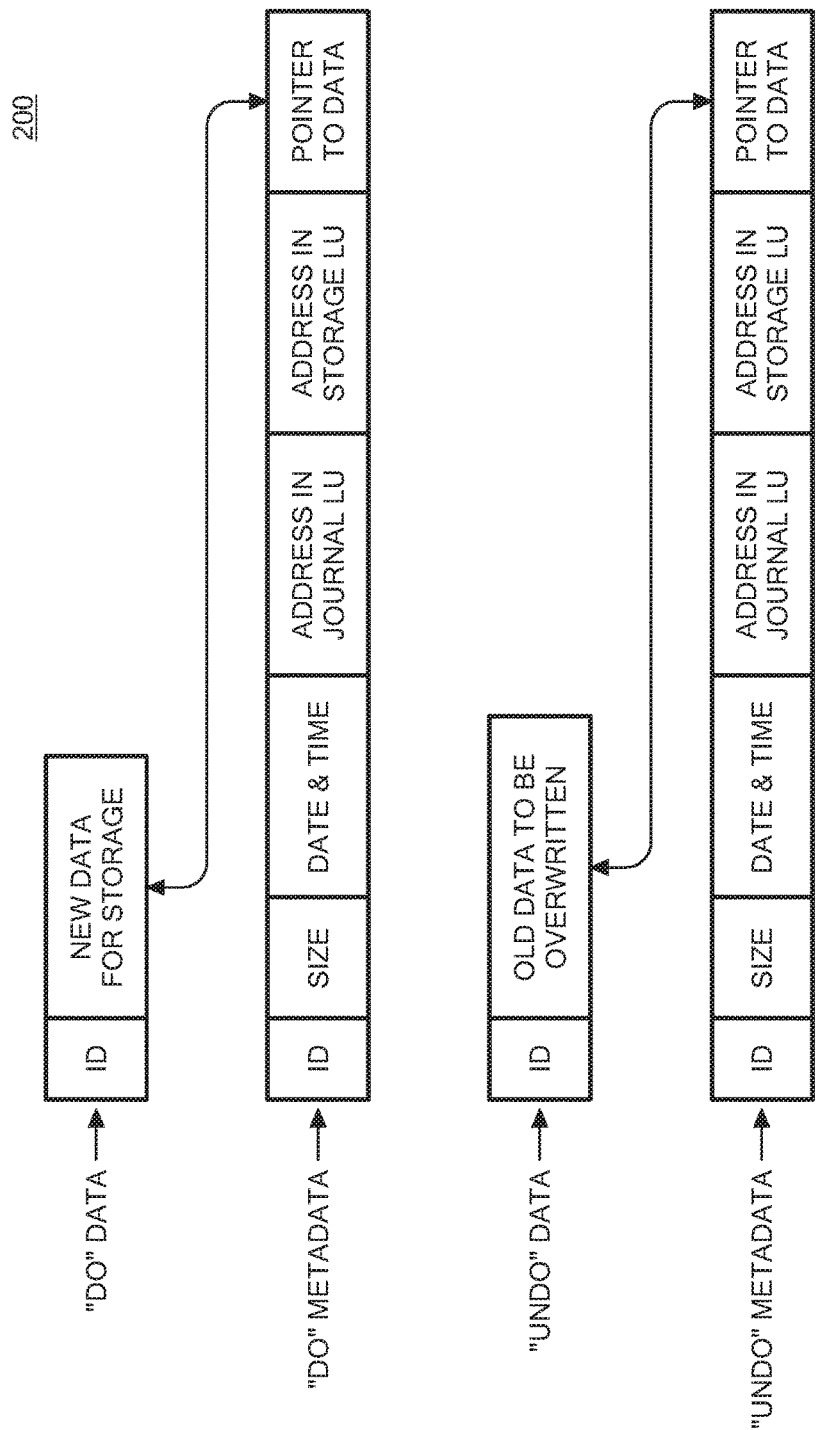
FIG. 2 is a diagram illustrating a journal history of write transactions for the data protection system of FIG. 1, according to an illustrative embodiment of the instant disclosure.

As shown in the example embodiment shown in FIG. 1, target storage system 120 may expose a journal LU 176 for maintaining a history of write transactions made to LU B 156, referred to herein as a "journal." In some embodiments, a journal may be used to provide access to storage at specified points-in-time (PITs), as discussed in greater detail in regard to FIG. 2. In some embodiments, the journal may be stored across multiple LUs (e.g., using striping, etc.). In some embodiments, target DPA 124 may include a journal processor 180 for managing the journal within journal LU 176. Referring back to the example embodiment of FIG. 1, journal processor 180 may manage the journal entries of LU B 156. Specifically, in some embodiments, journal processor 180 may enter write transactions received by the target DPA 124 from the source DPA 112 into the journal by writing them into journal LU 176, read the undo information for the transaction from LU B 156, update the journal entries in journal LU 176 with undo information, apply the journal transactions to LU B 156, and remove already-applied transactions from the journal. In one embodiment, journal processor 180 may perform processing such as described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

Some embodiments of data protection system 100 may be provided as physical systems for the replication of physical LUs, or as virtual systems for the replication of virtual LUs. For example, in one embodiment, a hypervisor may consume LUs and may generate a distributed file system on the logical units such as Virtual Machine File System (VMFS) that may generate files in the file system and expose the files as LUs to the virtual machines (each virtual machine disk is seen as a SCSI device by virtual hosts). In another embodiment, a hypervisor may consume a network based file system and exposes files in the Network File System (NFS) as SCSI devices to virtual hosts.

In some embodiments, in normal operation (sometimes referred to as "production mode"), DPA 112 may act as a source DPA for LU A 136. Thus, in some embodiments, protection agent 144 may act as a source protection agent, specifically by splitting I/O requests to host device 140 ("Device A"). In some embodiments, protection agent 144 may send an I/O request to source DPA 112 and, after receiving an acknowledgement from source DPA 112, may send the I/O request to LU A 136. In some embodiments, after receiving an acknowledgement from storage system 108, host 104 may acknowledge that the I/O request has successfully completed.

In some embodiments, when source DPA 112 receives a replicated I/O request from protection agent 144, source DPA 112 may transmit certain I/O information characterizing the write request, packaged as a "write transaction", over WAN 128 to target DPA 124 for journaling and for incorporation within target storage system 120. In some embodiments, when applying write operations to storage system 120, target DPA 124 may act as an initiator, and may send SCSI commands to LU B 156.

In some embodiments, source DPA 112 may send its write transactions to target DPA 124 using a variety of modes of transmission, including (i) a synchronous mode, (ii) an asynchronous mode, and (iii) a snapshot mode.

In some embodiments, in synchronous mode, source DPA 112 may send each write transaction to target DPA 124, may receive back an acknowledgement from the target DPA 124, and in turn may send an acknowledgement back to protection agent 144. In some embodiments, in synchronous mode, protection agent 144 may wait until receipt of such acknowledgement before sending the I/O request to LU 136.

Thus, in some embodiments such as described herein, in continuous mode, every write I/O to a production volume may be intercepted and sent to both the production volume and a replica volume. Thus, in some embodiments, continuous mode may provide a very low Recovery Point Objective (RPO), meaning that data on a replica volume lags data on the production volume by only a short time period (e.g., a few seconds). In some embodiments, RPO is an amount of data that the user is willing to lose in case of production disaster (e.g., an amount of time between replications). In some embodiments (e.g., for particularly important data), continuous mode may provide an RPO of zero (e.g., data on the replica volume is the same as data on the production volume) and high granularity of points in time (PITs) for restoring the production volume (e.g., since continuous replication may generate a replica each time there is a write operation to the production volume).

In some embodiments, in asynchronous mode, source DPA 112 may send an acknowledgement to protection agent 144 upon receipt of each I/O request, before receiving an acknowledgement back from target DPA 124.

In some embodiments, in snapshot mode, source DPA 112 may receive several I/O requests and combine them into an aggregate "snapshot" or "batch" of write activity performed in the multiple I/O requests, and may send the snapshot to target DPA 124 for journaling and incorporation in target storage system 120. In some embodiments, in snapshot mode, source DPA 112 may send an acknowledgement to protection agent 144 upon receipt of each I/O request, before receiving an acknowledgement back from target DPA 124.

Thus, in some embodiments, in snapshot mode, snapshot replicas of a production volume may be periodically generated, and changes in data may be tracked between consecutive snapshot replicas. For example, one or more write operations may modify data on the production volume between generation of snapshot replicas. In some embodiments, regions of the production volume that are modified, and the changed data written to the regions, may be tracked. In some embodiments, when a new snapshot replica is generated, modified regions may be read from the production volume and sent to the replica volume.

In some embodiments, a snapshot replica may be a differential representation of a volume. For example, the snapshot may include pointers to the original volume, and may point to log volumes for locations of the original volume that store data changed by one or more I/O requests. In some embodiments, snapshots may be combined into a snapshot array, which may represent different images over a time period (e.g., for multiple PITs).

In some embodiments, data protection system may include one or more consistency groups. In some embodiments, a consistency group may treat source volumes (e.g., production volumes) and target volumes (e.g., backup volumes) as a single logical entity for data replication and migration.

As described herein, in some embodiments, in normal operation, LU B 156 may be used as a backup of LU A 136. In such embodiments, while data written to LU A 136 by host 104 is replicated from LU A 136 to LU B 156, target host 116 should not send I/O requests to LU B 156. In some embodiments, to prevent such I/O requests from being sent, protection agent 164 may act as a target site protection agent for host device B 160 and may fail I/O requests sent from host 116 to LU B 156 through host device B 160. In some embodiments, in a recovery mode, target DPA 124 may undo the write transactions in journal LU 176 so as to restore the target storage system 120 to an earlier state.

Referring to FIG. 2, in some described embodiments, a write transaction 200 may be included within a journal and stored within a journal LU. In some embodiments, write transaction 200 may include one or more identifiers; a time stamp indicating the date and time at which the transaction was received by the source DPA; a write size indicating the size of the data block; a location in the journal LU where the data is entered; a location in the target LU where the data is to be written; and the data itself.

Referring to both FIGS. 1 and 2, in some embodiments, transaction 200 may correspond to a transaction transmitted from source DPA 112 to target DPA 124. In some embodiments, target DPA 124 may record write transaction 200 in the journal that includes four streams. In some embodiments, a first stream, referred to as a "DO" stream, includes a copy of the new data for writing to LU B 156. In some embodiments, a second stream, referred to as a "DO METADATA" stream, includes metadata for the write transaction, such as an identifier, a date and time, a write size, the offset within LU B 156 where the new data is written, and a pointer to the offset in the DO stream where the corresponding data is located. In some embodiments, a third stream, referred to as an "UNDO" stream, includes a copy of the data being overwritten within LU B 156 (referred to herein as the "old" data). In some embodiments, a fourth stream, referred to as an "UNDO METADATA" stream, includes an identifier, a date and time, a write size, a beginning address in LU B 156 where data was (or will be) overwritten, and a pointer to the offset in the UNDO stream where the corresponding old data is located.

Since the journal contains the "undo" information necessary to rollback storage system 120, in some embodiments, data that was stored in specific memory locations at a specified point in time may be obtained by undoing write transactions that occurred subsequent to such point in time (PIT).

In some embodiments, each of the four streams may hold a plurality of write transaction data. In some embodiments, as write transactions are received dynamically by the target DPA, the write transactions may be recorded at the end of the DO stream and the end of the DO METADATA stream, prior to committing the transaction.

In some embodiments, a metadata stream (e.g., UNDO METADATA stream or the DO METADATA stream) and the corresponding data stream (e.g., UNDO stream or DO stream) may be kept in a single stream by interleaving metadata and data.

Some described embodiments may validate that point-in-time (PIT) data replicas (e.g., data replicated to LU B 156) are valid and usable, for example to verify that the data replicas are not corrupt due to a system error or inconsistent due to violation of write order fidelity. In some embodiments, validating data replicas can be important, for example, in data replication systems employing incremental backup where an undetected error in an earlier data replica may lead to corruption of future data replicas.

In conventional systems, validating data replicas can increase the journal lag, which may increase a recovery time objective (RTO) of a data protection system (e.g., an elapsed time between replicas or PITs). In such conventional systems, if the journal lag time is significant, the journal may become full and unable to account for data changes due to subsequent transactions. Further, in such conventional systems, validating data replicas may consume system resources (e.g., processor time, memory, communication link bandwidth, etc.), resulting in reduced performance for system tasks.

Referring back to FIG. 1, in some embodiments, source side host 104 may operate one or more applications 101, and target side storage 120 may be a virtual or cloud storage system. Some embodiments may store LU B 156 as an enhanced copy of LU A 136. In some embodiments, an enhanced copy may include data associated with applications 101 and other data to be able to regenerate data. For example, other data may include the application and the whole operating environment which may include run time environment, run time parameters, data, data copies and any other data needed for one of applications 101 to operate.

In an illustrative embodiment, an enhanced copy may include application data, the application itself, application configuration data, application metadata, and runtime settings. For example, the application itself (e.g., an executable image of a particular version of the application) may be stored to be able to restore/access the data with the correct application version, which in some examples includes the application itself and the applications that generated the data copies. In some examples, the application configuration data enables the application to be run from the enhanced copy. In some examples, runtime settings enable the environment to be mimicked or restored.

In some embodiments, application metadata may include application operational settings, number of instances, scale out parameters, availability information, and other information that describes the operating environment of a host running the application. In some embodiments, the application metadata may also include parameters to connect to additional resources or data sources, such as databases, object stores, data volumes, file systems, or any service that the application was consuming at the time. In some embodiments, the application metadata may further include metadata providing information about resources used by the application, for example IDs, names, and/or types. In some embodiments, the enhanced copy may also include metadata about itself, for example a timestamp, size, and compression/archiving type. In some embodiments, the application metadata may further include parameters controlling whether to restore all of the above features/services, or partial of the features/services, restore only the data instead of the executable image of the application. In some embodiments, the parameters may also control the way the runtime environment is set up. For example, a restoration for a development environment may not restore all the runtime services or may restore them at a lower service level agreement (SLA), etc.

In some embodiments, runtime settings enable the environment to be mimicked, including allocation of proper processing resources (e.g., processor, memory, storage, operating system, network stack, proper system clock). In some embodiments, certain services that were utilized or connected with may also be restored based on the application metadata. In some embodiments, it is therefore possible to restore a full working copy of the application of a particular point in time, rather than just the application data.

In an illustrative embodiment, when an application is restored, an operating environment or execution environment will be established and configured based on the application metadata, including allocating proper resources, even setting up a system clock reflecting the time of the capture and copying. In some embodiments, a virtual machine may be provisioned and configured based on the application metadata, which mimics substantially the same operating environment at the time of the copying or capturing of the corresponding snapshot. In some embodiments, an executable image of the application is then executed within the operating environment and the application data is loaded into the memory and accessible by the application.

In some embodiments, it is therefore advantageously possible create a copy of the application in which the configurations, settings and environment (including clocks) appear to the developer to be moved back to those of the run time environment at the time of interest (e.g., a time at which a problem or bug was detected), even if available services have changed or been removed. In some embodiments, it becomes possible to provide the developer with a copy of the application where the environment is identical to the environment at the time of the problem or bug. In some embodiments, an enhanced copy ensures that even if the enhanced copy is dormant for a lengthy amount of time (e.g., several years), that the data can still be accessed.

Some embodiments may generate and employ enhanced copies such as described in U.S. patent application Ser. No. 14/978,351, filed on Dec. 22, 2015, entitled "STORING APPLICATION DATA AS AN ENHANCED COPY," which is incorporated by reference herein in its entirety, and which describes automated integration between a platform as a service (PaaS) and a data protection system that performs compute services concurrently with data services (e.g., restore, backup, etc.).

Figure 3:
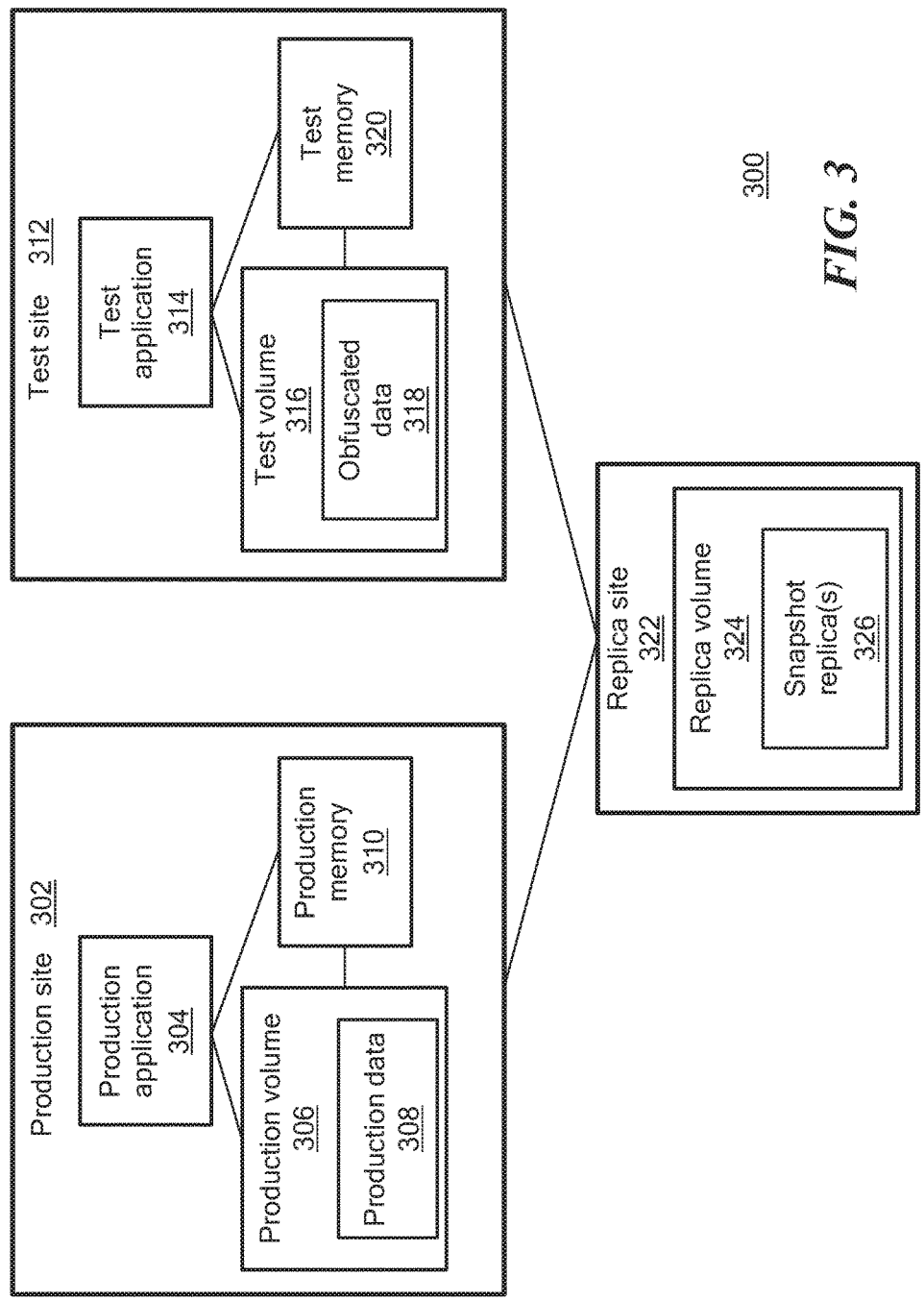
FIG. 3 is a block diagram of an example of a data protection system, according to an illustrative embodiment of the instant disclosure.

Referring to FIG. 3, an illustrative data system 300 is shown. As shown, data system 300 may include a production site 302, a replica site 322, and a test site 312. In some embodiments, production site 302, may operate one or more production applications 304, which may read and write production data 308 on one or more production volumes 306. In some embodiments, production memory 310 may include various runtime data associated with production application 304.

In some embodiments, production site 302 may periodically write snapshot replicas to replica site 322. In some embodiments, replica site 322 may include one or more replica volumes 324 containing one or more snapshot replicas 326. In some embodiments, snapshot replicas 326 may be differential snapshot replicas (e.g., representing only data changed on production volume 306 from the time of a previous snapshot replica). In other embodiments, at least one snapshot replica may be a replica of the entire production volume 306. In various embodiments, snapshot replicas 326 may be generated using a variety of data protection methods or processes, such as, for example, backup, replication, mirroring, snapshots, clones, copying, archiving, file system versioning, traffic replay or other similar technologies. In some embodiments, each snapshot replica may be complete copies, partial copies, differential copies, incremental copies, or any transformation of data representation including but not limited to compression, deduplication and encryption.

In some embodiments, each snapshot replica may represent a point-in-time (PIT) to which production volume 306 may be restored. In embodiments where each snapshot replica 326 is an enhanced copy, each enhanced copy snapshot replica may also represent a PIT to which production application 304 and production memory 310 may be restored. As will be described, in some embodiments, enhanced copy snapshot replicas 326 may be writable snapshot replicas.

Further, some embodiments may detect bugs or problems in a production application (e.g., 304). For example, some embodiments may automatically detect and test (or debug) faults, problems, bugs or other anomalies of production site 302, for example such as described in U.S. patent application Ser. No. 15/087,817, filed on Mar. 31, 2016, entitled "PROACTIVE DEBUGGING," which is incorporated by reference herein in its entirety.

In some embodiments, a snapshot replica of the time at which the problem occurred (or before) may be used to initiate test site 312 to enable debugging of the production application. Thus, in some embodiments, an enhanced copy snapshot replica may represent a PIT of production application 304, production volume 306, and production memory 310 that may be initiated on test application 314, test volume 316 and test memory 320 to enable debugging without removing production site 302 from normal production service. As will be described, in some embodiments, test volume 316 may employ production data (e.g., data 308) for testing. In embodiments where production data 308 is of a sensitive nature (e.g., medical record data, financial data, classified data, etc.), test volume 316 may employ obfuscated data 318, which may be an obfuscated version of production data 308.

For example, after a problem or bug is detected in production site 302, test site 312 may be initiated using an enhanced copy snapshot replica 326 from a time before (e.g., earlier than) the time the problem of bug occurred. For example, the most recent enhanced copy snapshot replica 326 may be employed to initiate test site 312. In some embodiments, by employing an enhanced copy snapshot replica, test site 312 may be advantageously initiated as a copy of production site 302, including the application, application configurations, settings and environment (including clocks) at, or just before, the time at which the problem or bug was detected.

In an embodiment, recent I/O requests and other data traffic received by production application 304 may be stored in order to be replayed to test application 314 after initiating test site 312 to a PIT using an enhanced copy snapshot replica. In such an embodiment, requests made to the production application 304 since the time of the most recent enhanced copy snapshot replica 326 may be stored. Thus, in some embodiments, test site 312 may be operated from a time before the problem was detected to a time at which the problem was detected.

Some embodiments may load test volume 316 with non-production data (e.g., development test data or backend data). For example, in situations where a problem or bug is related to interactions between services or to an amount of traffic, it may not be necessary to obtain and use actual production data. However, in situations where a problem of bug may be related to the data itself, problems or bugs may not be able to be tested without using the production data. In some embodiments, if the production data is of a sensitive nature, test site 312 may employ obfuscated production data before allowing developers capability to view and test (or debug) the test environment.

As described herein, in some embodiments, enhanced copy snapshot replicas 326 may also include memory snapshots (e.g., data from production memory 310). In some embodiments, memory snapshots store a copy of production memory 310 at any PIT, allowing test site 312 to be instantiated using that memory, thus allowing test site 312 to run at the same context the snapshot was taken.

Figure 4:
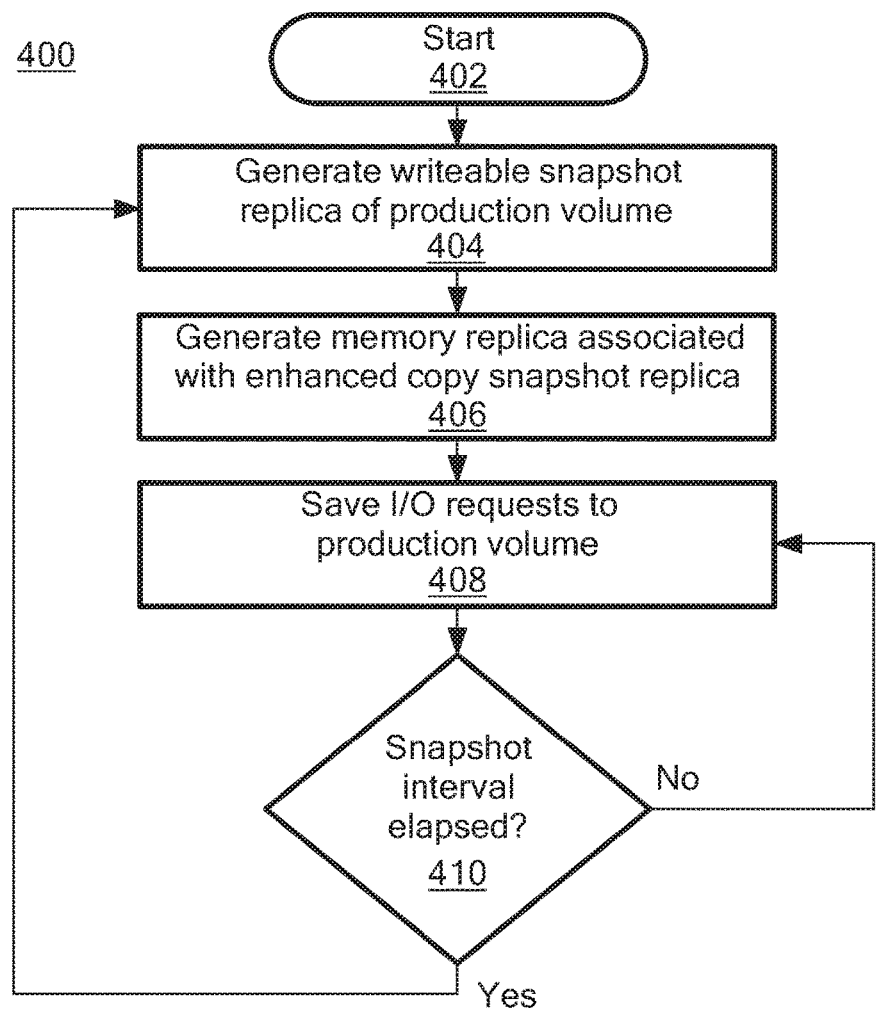
FIG. 4 is a flowchart of an example of a process to generate writable snapshot replicas of a production volume, according to an illustrative embodiment of the instant disclosure.

Further, as described herein, in some embodiments enhanced copy snapshot replicas 326 may be implemented as writable snapshots. In some embodiments, writable snapshots enable data system 300 to make an immediate copy of the production environment (e.g., production site 302) and begin altering it (e.g., as test site 312). Referring to FIG. 4, a flowchart of an illustrative process 400 for generating a writeable enhanced copy snapshot replica is shown. At block 402, process 400 begins. In some embodiments, at block 404, a writeable snapshot replica of a production volume (e.g., 306 of FIG. 3) is generated and written to a replica volume (e.g., 324 of FIG. 3). In some embodiments, at block 406, a memory replica of production memory (e.g., 310 of FIG. 3) is generated and written to the replica volume (e.g., 324 of FIG. 3) and associated with the snapshot replica of the production volume. In some embodiments, at block 408, any I/O requests received after the snapshot replica is generated (e.g., at blocks 404 and 406) are saved such that they can be replayed if the production volume is rolled back to the most recent snapshot replica. For example, the I/O requests may be stored in journal data such as described in regard to FIG. 2. In some embodiments, at block 410, if a snapshot interval has elapsed, then process 400 returns to block 404 to generate a subsequent snapshot replica. At block 410, if the snapshot interval has not elapsed, then process 400 returns to block 408 to continue tracking production volume I/O requests.

Figure 5:
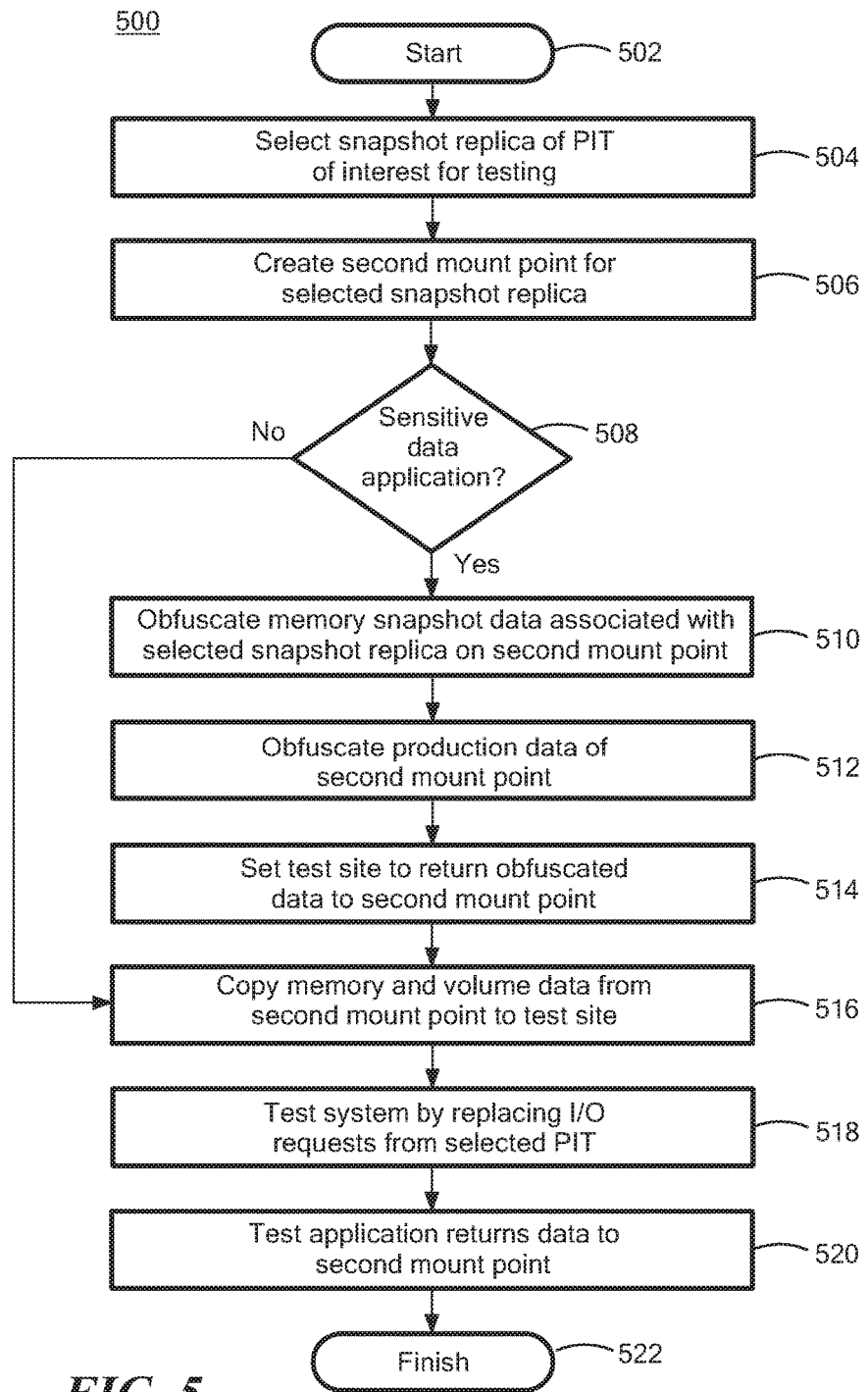
FIG. 5 is a flowchart of an example of a process to use a writeable snapshot replica in a test environment with obfuscated production data, according to an illustrative embodiment of the instant disclosure.

Referring to FIG. 5, a flowchart of an illustrative process 500 for initiating a test site (e.g., test site 312 of FIG. 3). At block 502, process 500 beings. In some embodiments, at block 504, a snapshot replica (e.g., one of snapshot replicas 326) is selected, for example by a developer using data system 300, for testing. In some embodiments, at block 506, another mount point of the selected snapshot replica data is created, and the test application (e.g., test application 314) may point to the new mount point. Thus, in some embodiments, for a writeable snapshot, the original snapshot replica may be available only to the original environment (e.g., production site 302), and the new mount point of the selected snapshot replica may be available only to the test environment (e.g., test site 312). Further, in some embodiments, for a writeable snapshot, unchanged locations of the new mount point may point to the locations of the original production snapshot data, while changed data may be written to a new location associated with the new mount point. Thus, in some embodiments, writable snapshots do not duplicate the snapshot data, but still allow a test environment to change the snapshot data without changing production snapshot data. In some embodiments, if necessary, sensitive production data may be obfuscated as it is read from the snapshot data.

In some embodiments, at block 508, if the production environment (e.g., production site 302) includes sensitive data (e.g., financial data, classified data, medical data, or other confidential or sensitive data), then at block 510 the memory snapshot data (e.g., the memory snapshot generated at block 406 of FIG. 4) may be obfuscated as the snapshot data is read from the second mount point of the selected snapshot replica. In some embodiments, at block 512, the production volume data associated with the selected snapshot replica is obfuscated for the second mount point. In some embodiments, at block 514, the test environment (e.g., test site 312) is set to return obfuscated data on the fly as the test application (e.g., test application 314) is run. Process 500 proceeds to block 516.

In some embodiments, at block 508, if the production environment (e.g., production site 302) does not include sensitive data, then process 500 proceeds to block 516.

In some embodiments, at block 518, the test application (e.g., test application 314) is run based upon the data provided to the test volume (e.g., test volume 316) and the test memory (e.g., test memory 320). In some embodiments, at block 518, I/O requests are replayed. For example, the developer may be able to run any inputs to the production application (e.g., production application 304) after the snapshot replica was created (e.g., at block of FIG. 4), in an effort to recreate and thereby diagnose and correct the error, fault or bug. In some embodiments, at block 520, the test application (e.g., test application 314) returns data associated with the run inputs to the second mount point. In some embodiments, if, at block 514 the test site was set to return obfuscated data, then at block 520, the returned data is obfuscated. For example, any call to any of the data services associated with the test application may return obfuscated data. In some embodiments, the developer may then employ the returned data to diagnose and correct the error, fault or bug. In some embodiments, at block 522, process 500 completes.

In some embodiments, process 500 may be performed upon user request to test system 300. In some embodiments, process 500 may be performed automatically upon an error occurrence in the production environment (e.g., production site 302).

Although not shown in FIG. 5, in some embodiments, data returned at block 520 may be deobfuscated and returned to the production site or the first mount point of the selected snapshot replica.

In some embodiments, running the test application on an obfuscated environment and also obfuscates the application memory structure. In some embodiments, if the test application includes one or more data services (e.g., object stores, relational databases, etc.) this data may also be obfuscated, allowing consistency across services. In some embodiments, the obfuscation occurs upon reading the data from the source (e.g., the data service or the replica site). In some embodiments, data obfuscation allows users to mask sensitive data such that various users would be able to run an application on the data, but without viewing the sensitive data. In some embodiments, upon copying the data set to the test environment, the data is obfuscated.

In some embodiments, obfuscation may work most beneficially for applications having a relatively well known memory structure such that internal variables and individual fields of data can be identified and obfuscated. For example, Java® Virtual Machine applications may be employed, since the location of internal application variables in memory is known. In addition, in some embodiments, obfuscation may work most beneficially for data having well-defined patterns, for example credit card numbers or serial IDs that have distinctive patterns that can be identified and validated for correctness before obfuscating them.

Figure 6:
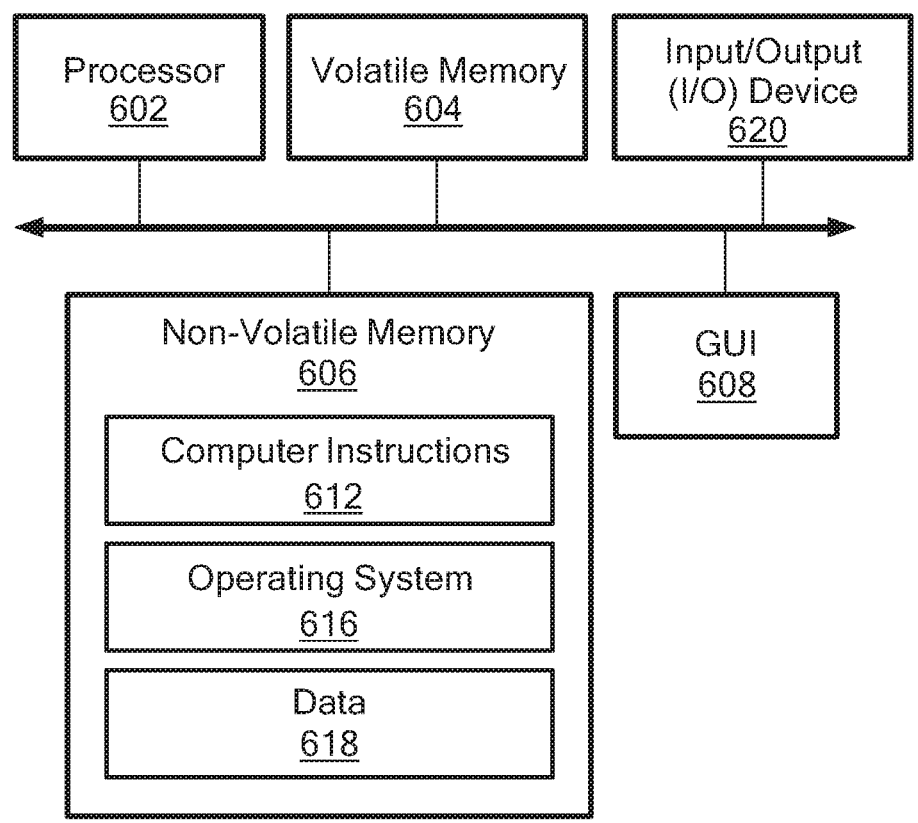
FIG. 6 is a block diagram of an example of a hardware device that may perform at least a portion of the processes in FIGS. 4-5.

In some described embodiments, hosts 104 and 116 of FIG. 1 may each correspond to one computer, a plurality of computers, or a network of distributed computers. For example, in some embodiments, host 104 and/or host 116 may be implemented as one or more computers such as shown in FIG. 6. As shown in FIG. 6, computer 600 may include processor 602, volatile memory 604 (e.g., RAM), non-volatile memory 606 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 608 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604 to perform at least a portion of the processes shown in FIGS. 4-5. Program code may be applied to data entered using an input device of GUI 608 or received from I/O device 620.

Processes 400 and 500 (FIGS. 4-5) are not limited to use with the hardware and software of FIG. 6 and may find applicability in any computing or processing environment and with any type of machine or set of machines that may be capable of running a computer program. Processes 400 and 500 may be implemented in hardware, software, or a combination of the two.

The processes described herein are not limited to the specific embodiments described. For example, processes 400 and 500 are not limited to the specific processing order shown in FIGS. 4-5. Rather, any of the blocks of processes 400 and 500 may be re-ordered, combined or removed, performed in parallel or in serial, as necessary, to achieve the results set forth herein.

Processor 602 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in an application specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors and/or one or more "virtual" (e.g., remotely located or "cloud") processors.

Various functions of circuit elements may also be implemented as processing blocks in a software program. Such software may be employed in, for example, one or more digital signal processors, microcontrollers, or general purpose computers. Described embodiments may be implemented in hardware, a combination of hardware and software, software, or software in execution by one or more physical and/or one or more virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method comprising:
    periodically generating writeable snapshot replicas of a production site of a storage system during a snapshot interval, the production site comprising a production volume, a production memory, and at least one production application;
    saving input/output (I/O) requests of the at least one production application during the snapshot interval;
    initiating a test environment with the writeable snapshot, the test environment comprising a test volume, a test memory, and at least one test application, wherein initiating the test environment with the writeable snapshot comprises obfuscating production data determined to be sensitive data in the writeable snapshot replica as the writeable snapshot replica is read by the test environment, the obfuscating comprising masking the production data to prevent viewing of the data;
    running the at least one test application in the test environment;
    replaying the saved I/O requests of the at least one production application to the at least one test application in the test environment; and
    providing output data from the test environment to the writeable snapshot comprising returning obfuscated data to the writeable snapshot and deobfuscating the returned obfuscated data, wherein the obfuscating and deobfuscating are performed based upon a memory structure of the data.

2. The method of claim 1, wherein the writeable snapshot replicas comprise data replicas of the production volume and memory data replicas of the production memory.

3. The method of claim 2, wherein the writeable snapshot replicas comprise enhanced copy snapshot replicas, each enhanced copy snapshot replica comprising application data generated from using the production application, the production application, a configuration of the production application, runtime settings to run the production application, and metadata comprising operational parameters, clocks, parameters to connect to additional resources, data sources and services, and information about resources used by the production application.

4. The method of claim 3, further comprising:
    upon detecting a problem during execution of a production application:
        initiating the test environment with a most recent writeable snapshot;
        running the at least one test application in the test environment;
        replaying the saved I/O requests of the at least one production application to the at least one test application in the test environment;
        providing output data from the test environment to the writeable snapshot; and
        determining whether the detected problem is reproduced in the test environment while replaying the saved I/O requests.

5. The method of claim 3, wherein the step of initiating a test environment with the writeable snapshot comprises:
    selecting a writeable snapshot replica for testing;
    generating a second mount point of the writeable snapshot replica and attaching the second mount point to the test environment;
    initiating the test volume based upon the data replicas of the production volume of the second mount point; and
    initiating the test memory based upon the memory data replicas of the production memory of the second mount point.

6. A system comprising:
    a processor; and
    memory storing computer program code that when executed on the processor causes the processor to operate a storage system, the storage system operable to perform the operations of:
        periodically generating writeable snapshot replicas of a production site of a storage system during a snapshot interval, the production site comprising a production volume, a production memory, and at least one production application;
        saving input/output (I/O) requests of the at least one production application during the snapshot interval;
        initiating a test environment with the writeable snapshot, the test environment comprising a test volume, a test memory, and at least one test application, wherein initiating the test environment with the writeable snapshot comprises obfuscating production data determined to be sensitive data in the writeable snapshot replica as the writeable snapshot replica is read by the test environment, the obfuscating comprising masking the production data to prevent viewing of the data;
        running the at least one test application in the test environment;
        replaying the saved I/O requests of the at least one production application to the at least one test application in the test environment; and
        providing output data from the test environment to the writeable snapshot comprising returning obfuscated data to the writeable snapshot and deobfuscating the returned obfuscated data, wherein the obfuscating and deobfuscating are performed based upon a memory structure of the data.

7. The system of claim 6, wherein the writeable snapshot replicas comprise data replicas of the production volume and memory data replicas of the production memory.

8. The system of claim 7, wherein the writeable snapshot replicas comprise enhanced copy snapshot replicas, each enhanced copy snapshot replica comprising application data generated from using the production application, the production application, a configuration of the production application, runtime settings to run the production application, and metadata comprising operational parameters, clocks, parameters to connect to additional resources, data sources and services, and information about resources used by the production application.

9. The system of claim 8, wherein the storage system is further operable to perform the operations of:
  upon detecting a problem during execution of a production application:
    initiating the test environment with the a most recent writeable snapshot;
    running the at least one test application in the test environment;
    replaying the saved I/O requests of the at least one production application to the at least one test application in the test environment;
    providing output data from the test environment to the writeable snapshot; and
    determining whether the detected problem is reproduced in the test environment while replaying the saved I/O requests.

10. The system of claim 8, wherein the storage system is further operable to perform the operations of:
  selecting a writeable snapshot replica for testing;
  generating a second mount point of the writeable snapshot replica and attaching the second mount point to the test environment;
  initiating the test volume based upon the data replicas of the production volume of the second mount point; and
  initiating the test memory based upon the memory data replicas of the production memory of the second mount point.

11. A computer program product including a non-transitory computer readable storage medium having computer program code encoded thereon that when executed on a processor of a computer causes the computer to operate a storage system, the computer program product comprising:
  computer program code for periodically generating writeable snapshot replicas of a production site of a storage system during a snapshot interval, the production site comprising a production volume, a production memory, and at least one production application, and the writeable snapshot replicas comprising data replicas of the production volume and memory data replicas of the production memory;
  computer program code for saving input/output (I/O) requests of the at least one production application during the snapshot interval;
  computer program code for initiating a test environment with the writeable snapshot, the test environment comprising a test volume, a test memory, and at least one test application, wherein initiating the test environment with the writeable snapshot comprises obfuscating production data determined to be sensitive data in the writeable snapshot replica as the writeable snapshot replica is read by the test environment, the obfuscating comprising masking the production data to prevent viewing of the data;
  computer program code for running the at least one test application in the test environment;
  computer program code for replaying the saved I/O requests of the at least one production application to the at least one test application in the test environment; and
  computer program code for providing output data from the test environment to the writeable snapshot comprising returning obfuscated data to the writeable snapshot and deobfuscating the returned obfuscated data, wherein the obfuscating and deobfuscating are performed based upon a memory structure of the data.

12. The computer program product of claim 11, wherein the writeable snapshot replicas comprise enhanced copy snapshot replicas, each enhanced copy snapshot replica comprising application data generated from using the production application, the production application, a configuration of the production application, runtime settings to run the production application, and metadata comprising operational parameters, clocks, parameters to connect to additional resources, data sources and services, and information about resources used by the production application.

13. The computer program product of claim 12, further comprising:
  computer program code for, upon detecting a problem during execution of a production application:
  initiating the test environment with the a most recent writeable snapshot;
    computer program code for running the at least one test application in the test environment;
    computer program code for replaying the saved I/O requests of the at least one production application to the at least one test application in the test environment;
    computer program code for providing output data from the test environment to the writeable snapshot; and
    computer program code for determining whether the detected problem is reproduced in the test environment while replaying the saved I/O requests.

14. The computer program product of claim 12, further comprising:
  computer program code for selecting a writeable snapshot replica for testing;
  computer program code for generating a second mount point of the writeable snapshot replica and attaching the second mount point to the test environment;
  computer program code for initiating the test volume based upon the data replicas of the production volume of the second mount point; and
  computer program code for initiating the test memory based upon the memory data replicas of the production memory of the second mount point.

* * * * *